(12) United States Patent
Oh

(10) Patent No.: US 12,030,452 B2
(45) Date of Patent: Jul. 9, 2024

(54) PASSENGER AIR BAG DEVICE

(71) Applicant: HYUNDAI MOBIS CO., LTD., Seoul (KR)

(72) Inventor: Young Ki Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/088,886

(22) Filed: Dec. 27, 2022

(65) Prior Publication Data

US 2024/0174196 A1 May 30, 2024

(30) Foreign Application Priority Data

Nov. 25, 2022 (KR) .......... 10-2022-0160121

(51) Int. Cl.
  *B60R 21/215* (2011.01)
  *B60R 21/16* (2006.01)
  *B60R 21/205* (2011.01)

(52) U.S. Cl.
  CPC .......... *B60R 21/215* (2013.01); *B60R 21/16* (2013.01); *B60R 21/205* (2013.01)

(58) Field of Classification Search
  CPC .................. B60R 21/2165; B60R 21/205
  See application file for complete search history.

(56) References Cited

U.S. PATENT DOCUMENTS

| | | | | |
|---|---|---|---|---|
| 5,997,030 | A * | 12/1999 | Hannert | B60R 21/2165 280/732 |
| 7,631,890 | B1 * | 12/2009 | Kalisz | B60R 21/2165 280/728.3 |
| 9,061,643 | B1 * | 6/2015 | Raines | B60R 21/04 |
| 11,325,290 | B2 * | 5/2022 | Stroebe | B29C 37/0057 |
| 2006/0061140 | A1 * | 3/2006 | Schuetz | B29C 44/1214 296/201 |
| 2010/0295275 | A1 | 11/2010 | Yeon et al. | |
| 2012/0068441 | A1 * | 3/2012 | Kalisz | B60R 21/2165 280/728.3 |
| 2012/0126514 | A1 * | 5/2012 | Choi | B60R 21/215 280/728.3 |
| 2019/0143929 | A1 * | 5/2019 | Lu | B60R 21/2165 280/728.3 |

(Continued)

FOREIGN PATENT DOCUMENTS

| | | | | |
|---|---|---|---|---|
| CN | 103764452 | B * | 5/2016 | .......... B60R 21/215 |
| CN | 105584451 | A * | 5/2016 | .......... B60R 21/215 |

(Continued)

OTHER PUBLICATIONS

Extended European search report issued on Aug. 18, 2023, in counterpart European Patent Application No. 22217009.4 (9 pages).

*Primary Examiner* — Nicole T Verley
(74) *Attorney, Agent, or Firm* — NSIP Law

(57) ABSTRACT

Disclosed is a passenger air bag (PAB) device that includes a crash pad and a PAB chute. The crash pad includes a cutting groove recessed at a predetermined depth in an inner side surface of the crash pad. The PAB chute includes an air bag door welded to the inner side surface in a shape covering the cutting groove. The air bag door includes a protruding portion protruding from a surface of the airbag door, disposed, in a state in which the air bag door is welded to the inner side surface, inside a space forming the cutting groove.

13 Claims, 9 Drawing Sheets

(56) References Cited

U.S. PATENT DOCUMENTS

| | | | | |
|---|---|---|---|---|
| 2021/0284095 A1* | 9/2021 | Jonietz | ............. | B60R 21/21656 |
| 2022/0234536 A1* | 7/2022 | Oh | ........................ | B60R 21/215 |

FOREIGN PATENT DOCUMENTS

| | | | | | |
|---|---|---|---|---|---|
| CN | 107521451 | A | * | 12/2017 | ............. B60R 21/20 |
| CN | 112208477 | A | * | 1/2021 | ............. B60R 21/02 |
| DE | 10 2015 220 302 | B3 | | 1/2017 | |
| DE | 202019102326 | U1 | * | 7/2019 | ........... B60R 21/205 |
| DE | 102019218155 | A1 | * | 1/2021 | ............. B60R 21/02 |
| EP | 1749707 | A2 | * | 2/2007 | ........ B29C 65/0618 |
| EP | 3730354 | A1 | * | 10/2020 | ....... B29C 45/14336 |
| JP | 2004-26053 | A | | 1/2004 | |
| KR | 20020057862 | A | * | 7/2002 | |
| KR | 10-2011-0030195 | A | | 3/2011 | |
| KR | 20210090361 | A | * | 7/2021 | |
| KR | 20020055969 | A | * | 7/2022 | |
| KR | 20220122903 | A | * | 9/2022 | |
| WO | WO-9961288 | A1 | * | 12/1999 | ......... B60R 21/2155 |
| WO | WO-2012160656 | A1 | * | 11/2012 | ........... B60R 21/205 |
| WO | WO-2015004977 | A1 | * | 1/2015 | ........ B29C 65/0618 |
| WO | WO-2018005197 | A1 | * | 1/2018 | ........ B60R 13/0256 |
| WO | WO-2023021894 | A1 | * | 2/2023 | |
| WO | WO-2023177758 | A1 | * | 9/2023 | |

\* cited by examiner

110:111, 112

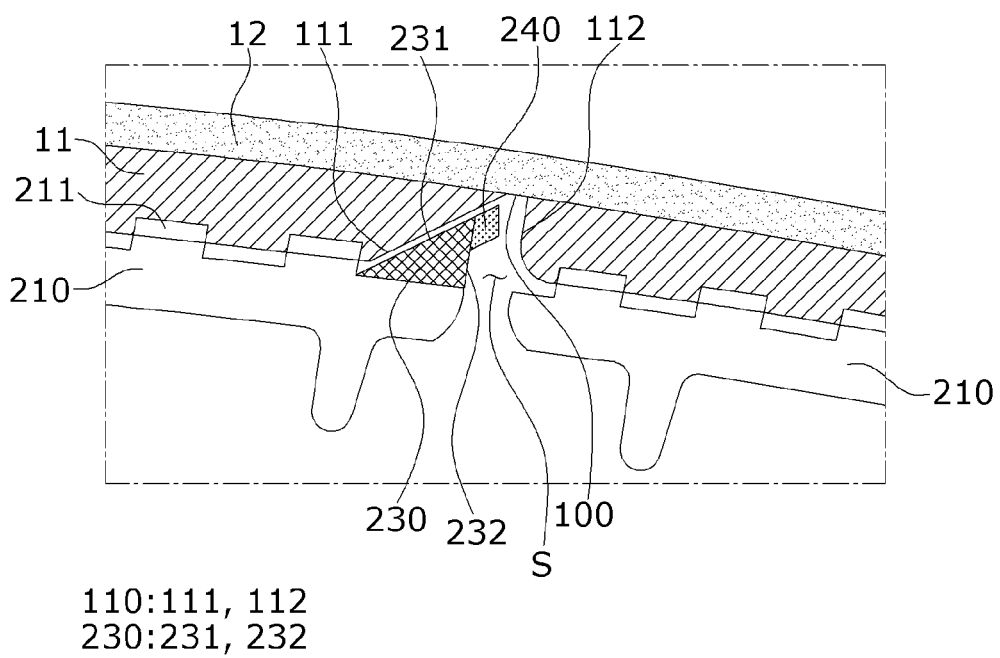

PASSENGER AIR BAG DEVICE

CROSS-REFERENCE TO RELATED APPLICATION

This application claims the benefit under 35 USC § 119(a) of Korean Patent Application No. 10-2022-0160121, filed on Nov. 25, 2022, in the Korean Intellectual Property Office, the entire disclosure of which is incorporated herein by reference for all purposes.

BACKGROUND

1. Field

The present disclosure relates to a passenger air bag device.

Generally, air bag devices are installed in vehicles for safety of passengers, and among air bag devices, a passenger air bag (PAB) is a device for protecting a passenger sitting in the front passenger seat.

A PAB is installed in a crash pad and has a structure that deploys through an air bag door of a PAB chute in the case of a vehicle crash. As the deployment structure, the air bag door is opened along a designated cutting line of the crash pad and allows the air bag to deploy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a passenger air bag (PAB) device that includes a crash pad and a PAB chute. The crash pad includes a cutting groove recessed at a predetermined depth in an inner side surface of the crash pad. The PAB chute includes an air bag door welded to the inner side surface in a shape covering the cutting groove. The air bag door includes a protruding portion protruding from a surface of the airbag door, disposed, in a state in which the air bag door is welded to the inner side surface, inside a space forming the cutting groove.

The cutting groove may include an inclined surface reflecting a draft angle, and a flat surface facing the inclined surface and not reflecting the draft angle. The cutting groove may extend in a width direction of a vehicle and constitutes a cutting line configured to be cut open by the air bag door, and the space is provided between the inclined surface and the flat surface.

The protruding portion may include a first surface extending upward from the surface, disposed parallel to the inclined surface, and a second surface extending downward from an end of the first surface toward the surface, disposed parallel to the flat surface. The protruding portion has a triangular cross-sectional structure having the first surface as a hypotenuse.

The protruding portion may further include an auxiliary protruding portion protruding outward from the second surface.

The protruding portion may be formed of one of a single split member and a plurality of split members, and may be arranged in a shape extending along the cutting groove.

The plurality of split members may be formed in different sizes.

The crash pad may include a panel portion in which the cutting groove is formed and a skin portion configured to cover an upper surface of the panel portion.

A portion of the skin portion that is exposed toward the cutting groove between the inclined surface and the flat surface may constitute the cutting line.

The air bag door may include a pair of door portions disposed in an opening formed in the PAB chute and a hinge portion configured to rotatably connect the pair of door portions to the PAB chute.

The protruding portion may be provided in an area of the door portion disposed below the inclined surface among the pair of door portions that vertically overlaps the inclined surface.

The door portion may include a welding rib protruding from a surface of the door portion, and a protruding length of the protruding portion may be larger than a protruding length of the welding rib.

The door portion may be partially connected to the PAB chute through a connecting rib extending from a side surface of the door portion in a short side direction of the door portion.

The PAB device may further include an air bag mounted on the PAB chute.

Other features and aspects will be apparent from the following detailed description, the drawings, and the claims.

BRIEF DESCRIPTION OF THE DRAWINGS

FIG. 11 is a view schematically illustrating a modified example of the protruding portion.

Figure 1:
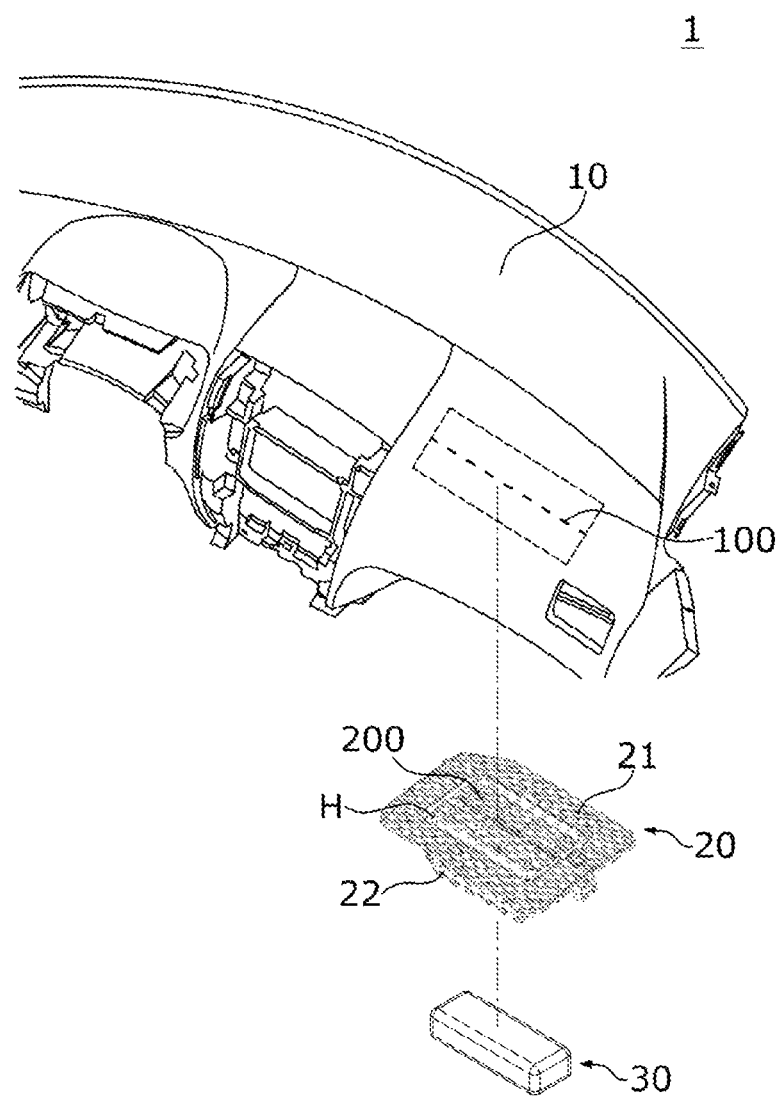
FIG. 1 is a view schematically illustrating a configuration of a passenger air bag (PAB) device according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
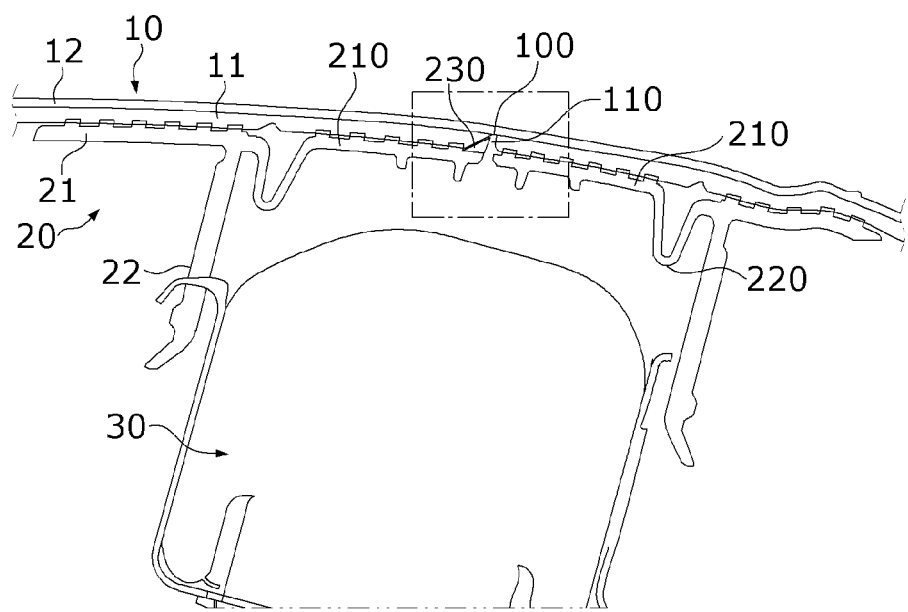
FIG. 2 is a view schematically illustrating a cross-section of the PAB device according to an embodiment of the present disclosure.
Figure 3:
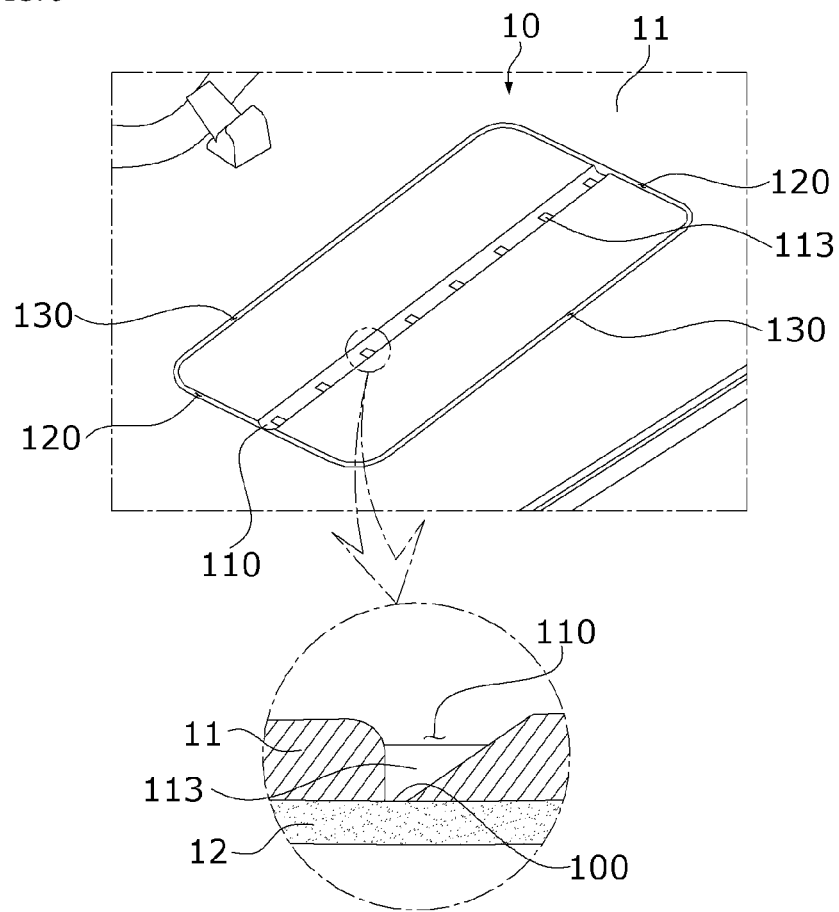
FIG. 3 is a view schematically illustrating an inner side surface of a crash pad in the PAB device.
Figure 4:
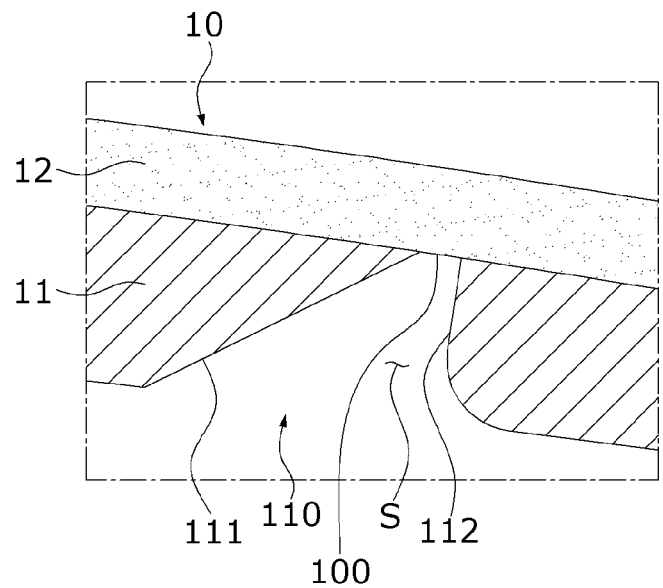
FIG. 4 is a view schematically illustrating a cross-section of a portion of the crash pad of FIG. 3 where a cutting groove is formed.
Figure 5:
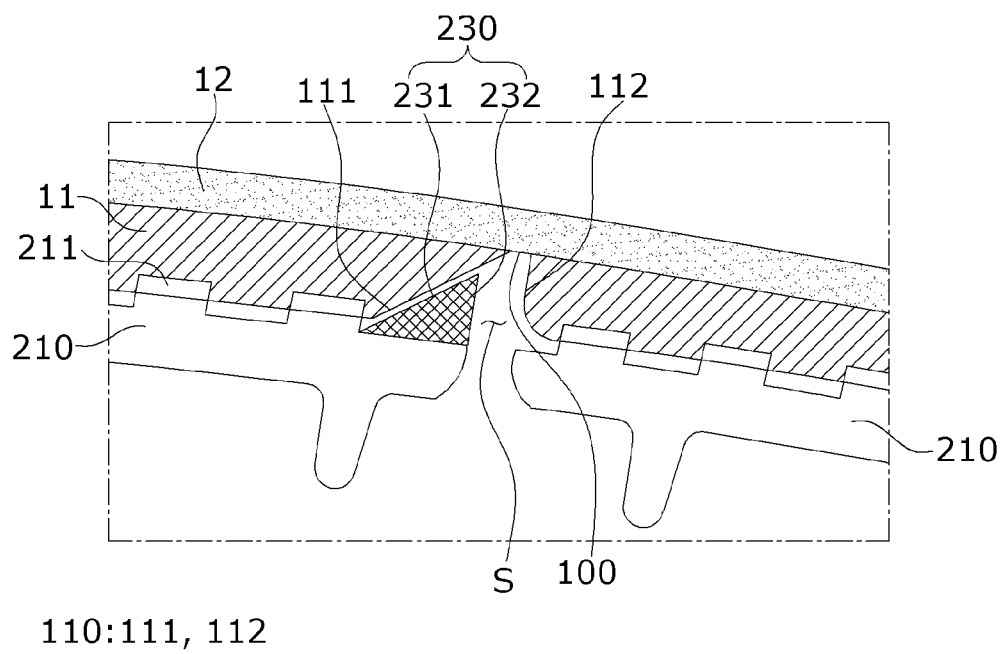
FIG. 5 is an enlarged view of an area indicated by a dotted line in FIG. 2.
Figure 6:
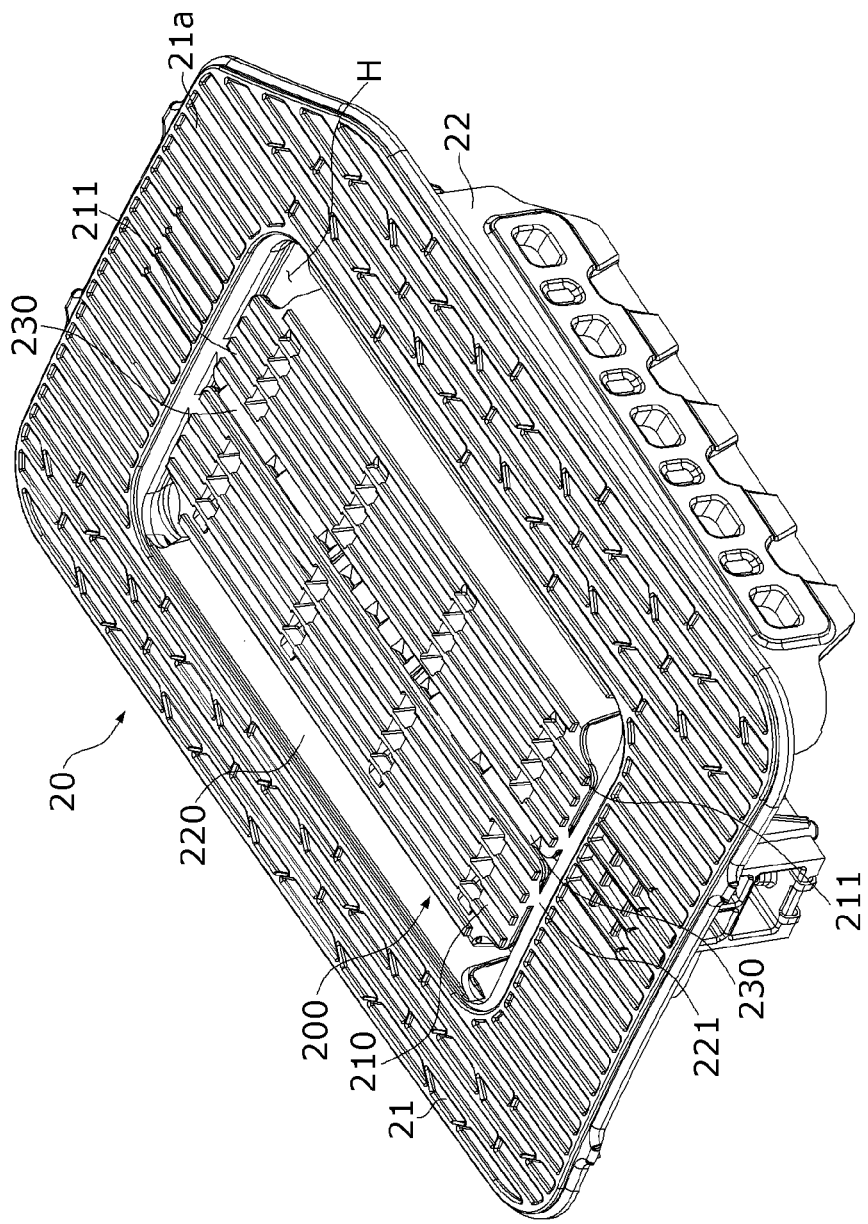
FIGS. 6 and 7 are views schematically illustrating a PAB chute including an air bag door in the PAB device.
Figure 7:
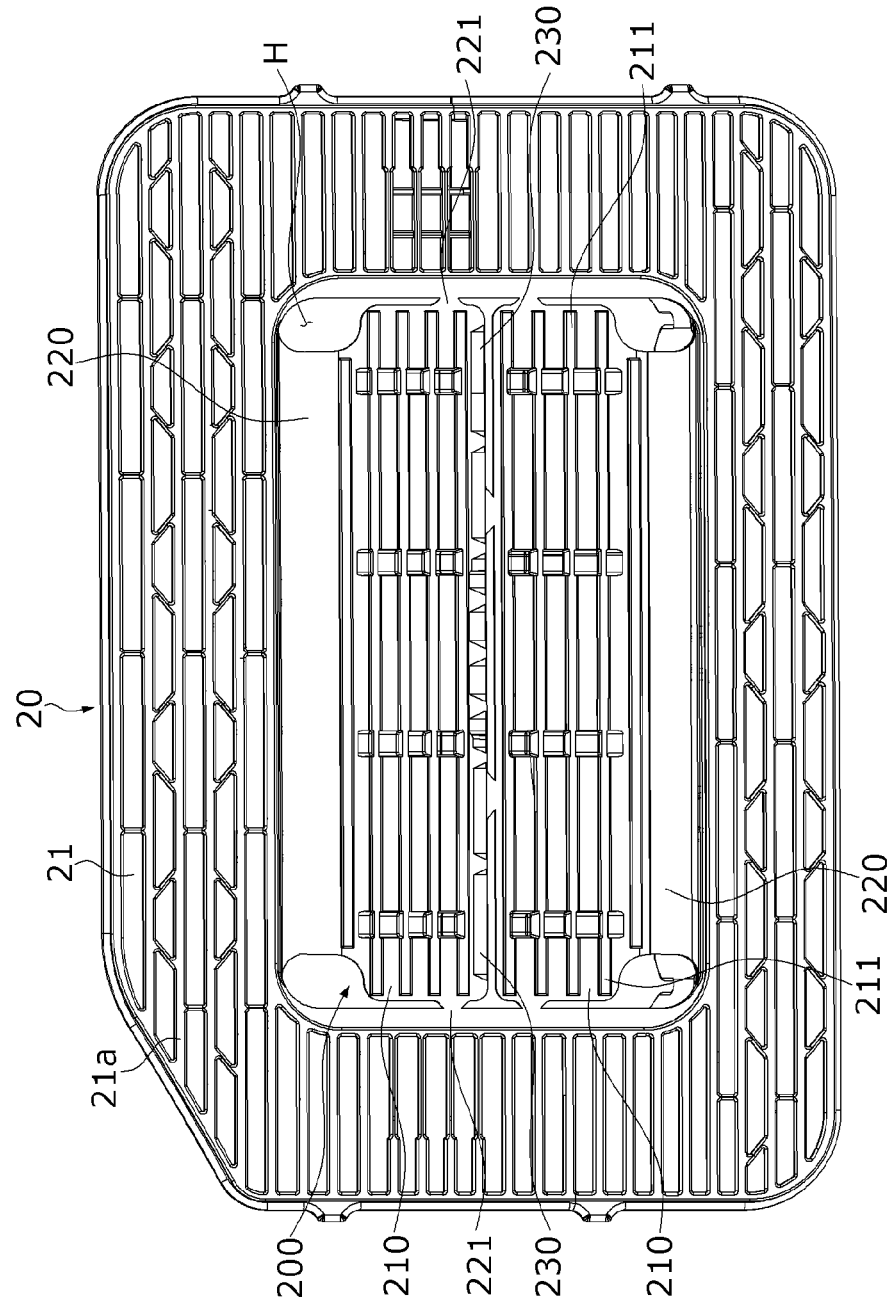
Figure 8:
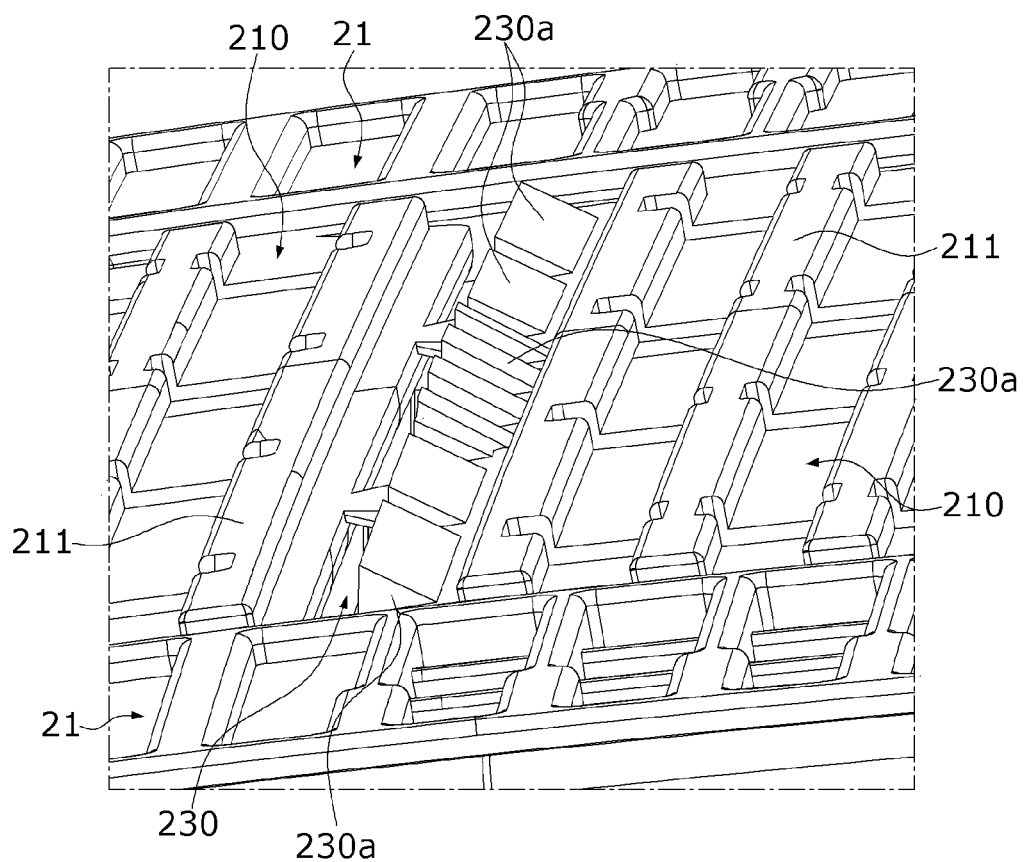
FIG. 8 is a view schematically illustrating a protruding portion provided on the air bag door.

FIG. 1 is a view schematically illustrating a configuration of a passenger air bag (PAB) device according to an embodiment of the present disclosure, FIG. 2 is a view schematically illustrating a cross-section of the PAB device according to an embodiment of the present disclosure, FIG. 3 is a view schematically illustrating an inner side surface of a crash pad in the PAB device, and FIG. 4 is a view schematically illustrating a cross-section of a portion of the crash pad of FIG. 3 where a cutting groove is formed.

Referring to the drawings, the PAB device 1 according to an embodiment of the present disclosure may include a crash pad 10, a PAB chute 20, and an air bag 30.

The crash pad 10 may have a cutting line 100 positioned at the front passenger seat of a vehicle. The cutting line 100 is cut open by an air bag door 200 upon the inflation of the air bag 30 that is caused by a crash of the vehicle. In this way, the cutting line 100 allows the air bag 30 to deploy.

The crash pad 10 includes a cutting groove 110 formed to be recessed at a predetermined depth in an inner side surface thereof, and the cutting groove 110 may extend in a width direction of the vehicle and constitute the cutting line 100.

As in the drawings, the crash pad 10 may include a panel portion 11 in which the cutting groove 110 is formed and a skin portion 12 configured to cover an upper surface of the panel portion 11.

The panel portion 11 corresponds to a lower layer of the crash pad 10 and may be formed by injection molding. In an embodiment, the panel portion 11 may be made of a paint protection film (PPF) material.

The cutting groove 110 is formed along with the panel portion 11 during injection molding of the panel portion 11 due to a shape processed in a mold for injection molding of the panel portion 11 and may be formed by so-called "in-mold scoring."

Accordingly, the cutting groove 110 may have a structure including an inclined surface 111 reflecting a draft angle and a flat surface 112 which faces the inclined surface 111 and does not reflect the draft angle. Also, a space (for example, an empty space) S forming the cutting groove 110 may form a triangular cross-sectional structure having the inclined surface 111 as a hypotenuse between the inclined surface 111 and the flat surface 112.

The inclined surface 111 and the flat surface 112 may each be formed to have a structure extending from a lower surface of the panel portion 11 to an upper surface thereof, and the cutting groove 110 may be formed to pass through the panel portion 11 due to a thickness of the mold.

Such a structure of the cutting groove 110 corresponds to a feature due to the application of in-mold scoring, and the structure may be formed to have a substantially triangular cross-section due to a draft angle for ejection from the mold.

Of course, according to embodiments, a method of forming the cutting groove 110 by postprocessing through milling, laser, or the like after injection molding of the panel portion 11 may also be considered. However, since there is a problem of an increase in manufacturing costs in this case, forming the cutting groove 110 by in-mold scoring in order to reduce costs is described in the present embodiment.

The cutting groove 110 formed in this way may longitudinally extend in the width direction of the vehicle and constitute the cutting line 100.

In an embodiment, reinforcing ribs 113 may be provided at predetermined intervals in the cutting groove 110 in a longitudinal direction thereof. The reinforcing ribs 113 prevent distortion of the panel portion 11 due to the formation of the cutting groove 110 and may be formed during injection molding of the panel portion 11.

A breakage groove 120 and a hinge groove 130 may be formed at a periphery of the cutting groove 110.

The skin portion 12 corresponds to an upper layer of the crash pad 10. The skin portion 12 may cover the upper surface of the panel portion 11 and be exposed inside the vehicle.

A portion of the skin portion 12 that is exposed toward the cutting groove 110 between the inclined surface 111 and the flat surface 112 may constitute the cutting line 100.

The skin portion 12 may be formed by injection molding. The panel portion 11 may be inserted, and the skin portion 12 may be integrally injection molded with the panel portion 11. In an embodiment, the skin portion 12 may be made of a thermoplastic polyurethane (TPU) material.

FIGS. 5 to 8 schematically illustrate the PAB chute 20 and the air bag door 200 according to an embodiment of the present disclosure.

Referring to the drawings, the PAB chute 20 may include a main body portion 21 and a sidewall portion 22.

The main body portion 21 may be provided in a substantially plate-like shape and may be coupled to the inner side surface of the crash pad 10 by welding. In an embodiment, the main body portion 21 may include a welding rib 21a and be coupled by methods such as vibration welding.

An opening H formed to pass through a central area may be provided in the main body portion 21.

The sidewall portion 22 may be provided to extend to a lower portion of the main body portion 21 and may have an accommodation space configured to accommodate the air bag 30 therein.

The air bag 30 may be mounted in the sidewall portion 22. The air bag 30 may be made of a fabric material having flexibility and may be configured to inflate due to a gas generated from an inflator (not illustrated).

The PAB chute 20 has the air bag door 200 welded to the inner side surface of the crash pad 10 in a shape that covers the cutting groove 110.

The air bag door 200 may be disposed in the opening H of the main body portion 21.

The air bag door 200 may include a protruding portion 230 protruding from a surface thereof. Also, the air bag door 200 may be configured so that, in a state in which the air bag door 200 is welded to the inner side surface of the crash pad 10, the protruding portion 230 is disposed inside the empty space S forming the cutting groove 110.

That is, the cutting line 100 of the crash pad 10 is a portion whose thickness is weakened due to the formation of the cutting groove 110 and thus may easily break. Also, due to a decrease in flexural rigidity, sinking may occur in the empty space S forming the cutting groove 110. Thus, the protruding portion 230 may be formed on the surface of the air bag door 200 to fill the empty space S forming the cutting groove 110, and in this way, the crash pad 10 may be supported so as not to sink where the cutting line 100 is formed, and rigidity may be improved so that the cutting line 100 does not easily break.

In an embodiment, the air bag door 200 may be made of a thermoplastic olefin (TPO) material.

The air bag door 200 may include a pair of door portions 210 disposed in the opening H formed in the PAB chute 20 and a hinge portion 220 configured to rotatably connect the pair of door portions 210 to the PAB chute 20.

The door portions 210 may open or close the opening H in a split structure. The door portions 210 may be configured to open toward each of the interior and an engine room.

The hinge portion 220 may connect a side surface of each door portion 210 in a long side direction thereof to the main body portion 21 of the PAB chute 20. The hinge portion 220 may have a substantially V-shaped or U-shaped cross-sectional structure.

Also, the door portion 210 may be partially connected to the main body portion 21 of the PAB chute 20 through a connecting rib 221 extending across the opening H from a side surface of the door portion 210 in a short side direction thereof. The connecting rib 221 may be formed to have a small thickness to break upon opening of the door portion 210.

The door portion 210 may include a welding rib 211 formed to protrude from a surface thereof. Also, the protruding portion 230 may be provided on the surface of the door portion 210 parallel to the welding rib 211.

A protruding length of the protruding portion 230 may be relatively larger than a protruding length of the welding rib 211.

The protruding portion 230 may be provided in an area of the door portion 210 disposed below the inclined surface 111 of the cutting groove 110 among the pair of door portions 210 that vertically overlaps the inclined surface 111.

As in the drawings, the protruding portion 230 may include a first surface 231 which extends upward from the surface and is disposed parallel to the inclined surface 111 of the cutting groove 110 and a second surface 232 which extends downward from an end of the first surface 231 toward the surface and is disposed parallel to the flat surface 112 of the cutting groove 110.

The protruding portion 230 may have a triangular cross-sectional structure having the first surface 231 as a hypotenuse. That is, the protruding portion 230 may have a shape that corresponds to the cross-sectional shape of the empty space S forming the cutting groove 110.

The protruding portion 230 may be disposed in the empty space S of the cutting groove 110 in a state in which the protruding portion 230 is welded to the inner side surface of the crash pad 10 through the welding rib 211. In this way, a vulnerable structure of the crash pad 10 can be compensated for.

Also, in a process in which the air bag 30 inflates and the door portions 210 open, the protruding portion 230 provides support by coming in direct contact with the inclined surface 111 of the cutting groove 110. In this way, an inflation force of the air bag 30 is fully applied to the cutting line 100 and allows breakage to occur along the cutting line 100.

Figure 9:
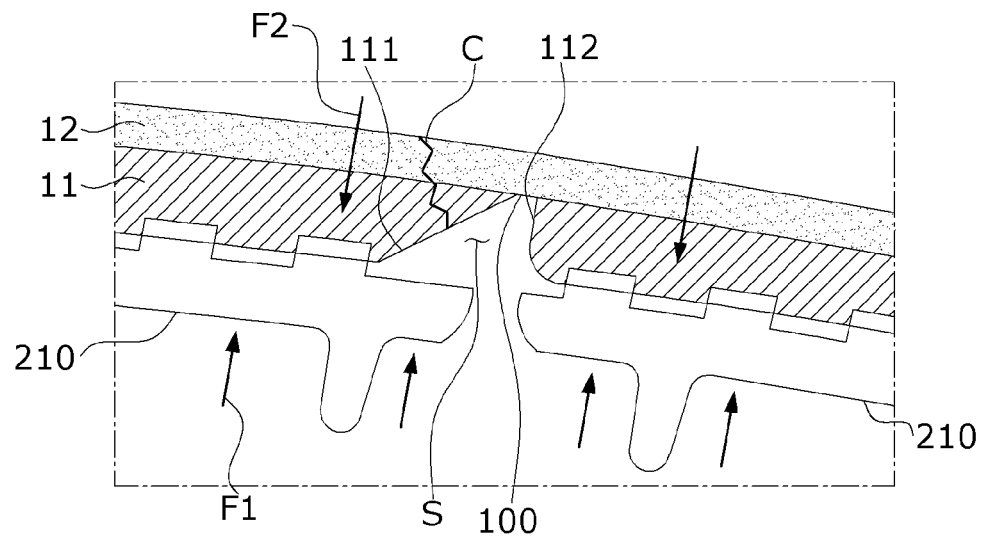
FIG. 9 is a view schematically illustrating a state in which a crack is formed in the crash pad due to the air bag door in a structure without the protruding portion.

That is, in a structure without the protruding portion 230 as in FIG. 9, upon opening of the door portions 210 receiving the inflation force of the air bag 30, due to a force F1 applied to the crash pad 10 by the door portions 210 and a force F2 of the skin portion 12 lasting until the skin portion 12 is cut open, a crack C starts along the inclined surface 111, and irregular breakage deviating from an intended scoring line occurs.

As a result, a sharp cross-sectional shape is formed along the cut-open cross-section, and this may cause separated fragments to scatter and the deployed air bag 30 to be caught. In particular, in a low-temperature environment, the cutting line 100 deviates from a set scoring line, and the shape of the cutting line 100 becomes irregular and unstable. This may cause damage to the air bag 30 and incorrect deployment of the air bag 30, which may cause an injury to a passenger.

Figure 10:
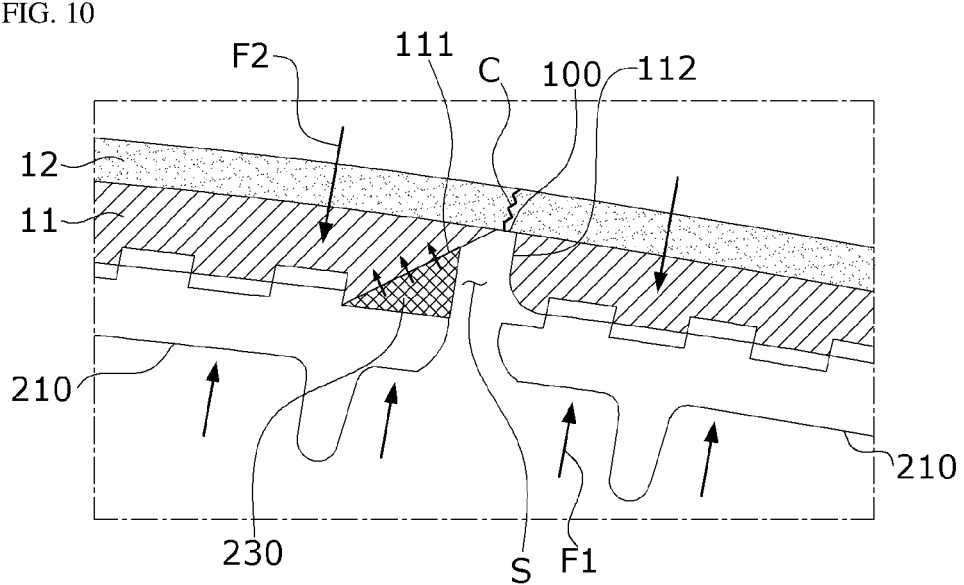
FIG. 10 is a view schematically illustrating a state in which a crack is formed in the crash pad due to the air bag door in a structure with the protruding portion according to an embodiment of the present disclosure.

Referring to FIG. 10, in the structure in which the protruding portion 230 fills the empty space of the cutting groove 110, since the protruding portion 230 supports the inclined surface 111, a crack C starts along the cutting line 100, and breakage occurs in a regular shape along an intended scoring line. As a result, the uniform cutting line 100 may be maintained, and a risk of causing damage to the air bag 30 is significantly reduced, which may contribute to quality improvement.

In an embodiment, the protruding portion 230 may be formed of a plurality of split members 230a and may be arranged in a shape that extends along the cutting groove 110. The reinforcing ribs 113 of the cutting groove 110 may be positioned in spaces between the split members 230a. That is, when the protruding portion 230 is disposed in the cutting groove 110, in order to prevent interference with the reinforcing ribs 113 of the cutting groove 110, the split members 230a may be separated from each other at the positions of the reinforcing ribs 113.

The plurality of split members 230a may be formed in different sizes. For example, the size of the split member 230a disposed at a central area of the door portions 210 may be configured to be larger than the size of the split member 230a disposed at both side edge areas of the door portions 210. Such a configuration has an effect of allowing an inflation force of the air bag 30, which is applied to the cutting line 100 in the crash pad 10, to be applied more to a central area of the cutting line 100 than to edge areas of the cutting line 100.

Of course, the protruding portion 230 may be formed of a single structure.

FIG. 11 schematically illustrates a modified example of the protruding portion 230.

Referring to the drawing, the protruding portion 230 may further include an auxiliary protruding portion 240 protruding outward from the second surface 232.

The auxiliary protruding portion 240 may extend from the protruding portion 230 toward the flat surface 112 of the cutting groove 110 and may be configured to, upon opening of the door portions 210, press the skin portion 12 constituting the cutting line 100.

Accordingly, the auxiliary protruding portion 240 may allow an inflation force of the air bag 30 to be more directly applied to the cutting line 100 so that breakage occurs along the cutting line 100 as intended.

Various embodiments of the present disclosure do not list all available combinations but are for describing a representative aspect of the present disclosure, and descriptions of various embodiments may be applied independently or may be applied through a combination of two or more.

An embodiment of the present invention can provide a PAB device allowing breakage to occur along a cutting line of a crash pad upon opening of an air bag door due to the inflation of an air bag, thus preventing a problem that fragments scatter or an air bag is caught and damaged.

The PAB device provides the aforementioned benefit in contrast to a crash pad in which a cutting line is processed by in-mold scoring and may have a problem that breakage irregularly occurs away from the cutting line instead of occurring along the cutting line. Fragments resulting from the irregular breakage may cause an injury to a passenger or cause an air bag to be caught and damaged.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A passenger air bag (PAB) device comprising:
   a crash pad including a cutting groove recessed at a predetermined depth in an inner side surface of the crash pad;
   a PAB chute including an air bag door welded to the inner side surface of the crash pad in a shape covering the cutting groove, the air bag door including a protruding portion, the air bag door being welded to the inner side of the crash pad, inside a space forming the cutting groove; and
   an air bag, the PAB chute being positioned between the air bag and the crash pad,
   wherein the protruding portion protrudes from a surface of the air bag door toward the crash pad, and
   wherein, when the air bag is deployed, the air bag is inflated to break one or more welds between the air bag door and the inner side of the crash pad, and force the protruding portion against the cutting groove of the crash pad to form a crack in the crash pad opposite the cutting groove, before the door breaks open the crash pad to allow the air bag to extend out of the crash pad.

2. The PAB device of claim 1,
   wherein the cutting groove comprises:
      an inclined surface reflecting a draft angle; and
      a flat surface facing the inclined surface and not reflecting the draft angle, and
   wherein the cutting groove extends in a width direction of a vehicle and constitutes a cutting line configured to be cut open by the air bag door, and the space is provided between the inclined surface and the flat surface.

3. The PAB device of claim 2, wherein the crash pad includes a panel portion in which the cutting groove is formed and a skin portion configured to cover an upper surface of the panel portion.

4. The PAB device of claim 3, wherein a portion of the skin portion that is exposed toward the cutting groove between the inclined surface and the flat surface constitutes the cutting line.

5. The PAB device of claim 2, wherein the air bag door comprises:
   a pair of door portions disposed in an opening formed in the PAB chute; and
   a hinge portion configured to rotatably connect the pair of door portions to the PAB chute.

6. The PAB device of claim 5, wherein the protruding portion is provided in an area of the door portion disposed below the inclined surface among a pair of door portions that vertically overlap the inclined surface.

7. The PAB device of claim 5, wherein the door portion includes a welding rib protruding from a surface of the door portion, and a protruding length of the protruding portion is larger than a protruding length of the welding rib.

8. The PAB device of claim 5, wherein the door portion is partially connected to the PAB chute through a connecting rib extending from a side surface of the door portion in a short side direction of the door portion.

9. The PAB device of claim 1, wherein the air bag is mounted on the PAB chute.

10. A passenger air bag (PAB) device comprising:
   a crash pad including a cutting groove recessed at a predetermined depth in an inner side surface of the crash pad; and
   a PAB chute including an air bag door welded to the inner side surface in a shape covering the cutting groove,
   wherein the air bag door includes a protruding portion, protruding from a surface of the airbag door, disposed, in a state in which the air bag door is welded to the inner side surface, inside a space forming the cutting groove,
   wherein the cutting groove comprises:
      an inclined surface reflecting a draft angle; and
      a flat surface facing the inclined surface and not reflecting the draft angle,
   wherein the cutting groove extends in a width direction of a vehicle and constitutes a cutting line configured to be cut open by the air bag door, and the space is provided between the inclined surface and the flat surface,
   wherein the protruding portion comprises:
      a first surface extending upward from the surface, disposed parallel to the inclined surface; and
      a second surface extending downward from an end of the first surface toward the surface, disposed parallel to the flat surface, and
   wherein the protruding portion has a triangular cross-sectional structure having the first surface as a hypotenuse.

11. The PAB device of claim 10, wherein the protruding portion further comprises an auxiliary protruding portion protruding outward from the second surface.

12. A passenger air bag (PAB) device comprising:
   a crash pad including a cutting groove recessed at a predetermined depth in an inner side surface of the crash pad; and
   a PAB chute including an air bag door welded to the inner side surface in a shape covering the cutting groove,
   wherein the air bag door includes a protruding portion, protruding from a surface of the airbag door, disposed, in a state in which the air bag door is welded to the inner side surface, inside a space forming the cutting groove,
   wherein the cutting groove comprises:
      an inclined surface reflecting a draft angle; and
      a flat surface facing the inclined surface and not reflecting the draft angle,
   wherein the cutting groove extends in a width direction of a vehicle and constitutes a cutting line configured to be cut open by the air bag door, and the space is provided between the inclined surface and the flat surface, and
   wherein the protruding portion, formed of one of a single split member and a plurality of split members, is arranged in a shape extending along the cutting groove.

13. The PAB device of claim 12, wherein the plurality of split members are formed in different sizes.

* * * * *